United States Patent [19]

Saleh

[11] Patent Number: 4,785,548

[45] Date of Patent: Nov. 22, 1988

[54] APPARATUS AND METHOD FOR ACCURATELY SETTING THE CUTTING GAP OF A FIBER CUTTING ASSEMBLY

[75] Inventor: Lotfy L. Saleh, Matthews, N.C.

[73] Assignee: Celanese Fibers, Inc., New York, N.Y.

[21] Appl. No.: 84,225

[22] Filed: Aug. 12, 1987

[51] Int. Cl.⁴ ............................ G01B 7/04; B01G 1/04
[52] U.S. Cl. .................................. 33/628; 83/37; 83/913
[58] Field of Search ............... 33/628, 178 E, 635; 83/37, 913

[56] References Cited

U.S. PATENT DOCUMENTS 2,788,255  4/1957  Farber ................................ 33/628
3,826,163  7/1974  Spaller, Jr. et al. ............... 83/913

Primary Examiner—William D. Martin, Jr.
Attorney, Agent, or Firm—Forrest D. Stine

[57] ABSTRACT

An apparatus and method for accurately setting a cutting gap of a fiber cutting assembly of the type having a cutter reel with a plurality of radially spaced apart, cutting blades and a presser roll mounted adjacent to the cutter reel and having a peripheral surface positioned at a predetermined distance from the cutting edges of the cutting blades to define the cutting gap. The apparatus comprises a gauge member at one of the cutting blade positions which extends radially beyond the radial distance of the blades and corresponds to the desired cutting gap setting, and means for electrically sensing contact of the gauge member with the presser roll.

7 Claims, 1 Drawing Sheet

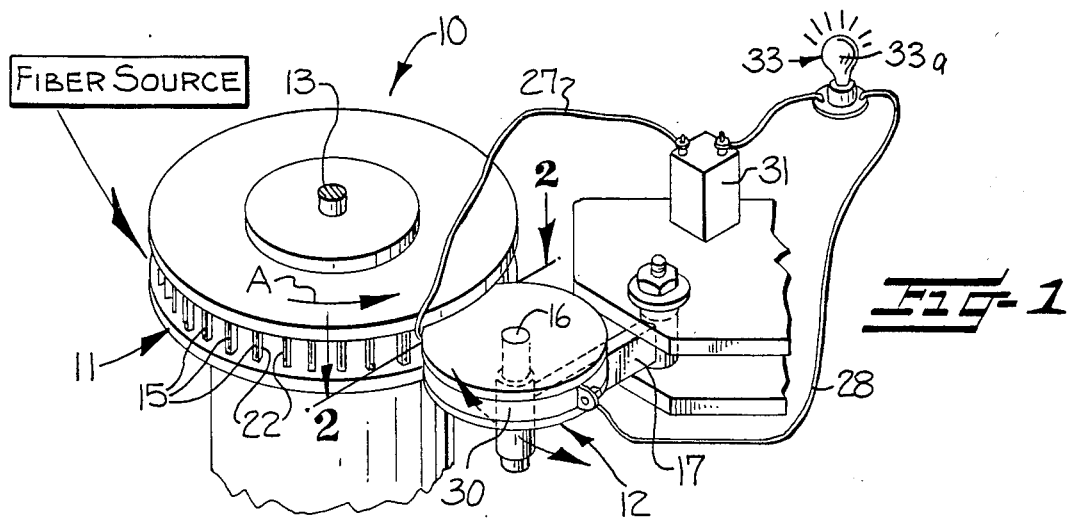
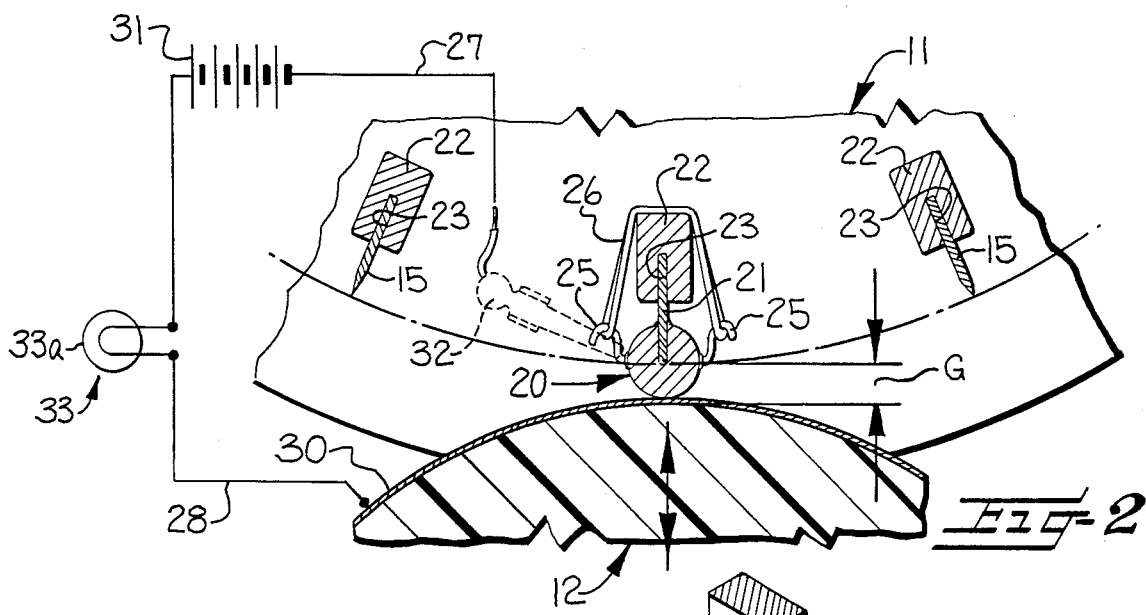
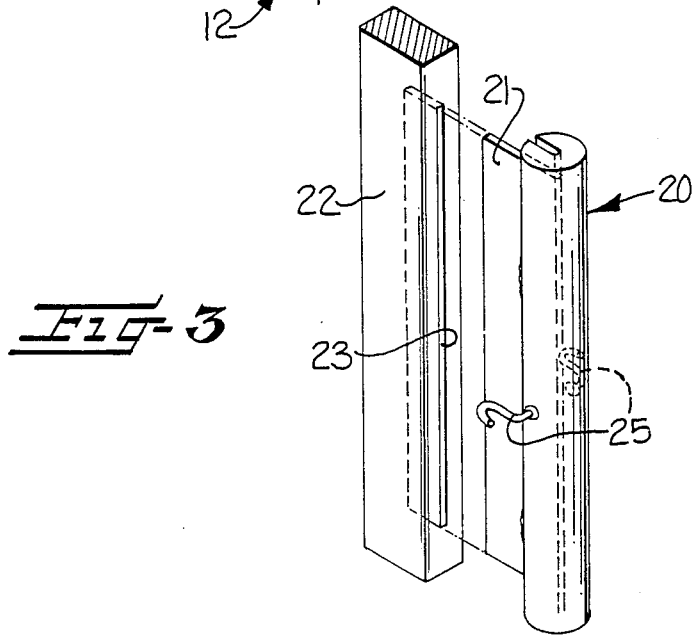

APPARATUS AND METHOD FOR ACCURATELY SETTING THE CUTTING GAP OF A FIBER CUTTING ASSEMBLY

FIELD AND BACKGROUND OF THE INVENTION

The present invention relates to an apparatus and method useful in fiber or tow cutting operations for optimizing and accurately setting the cutting gap of a fiber cutting assembly.

The present invention is adapted for use in cutting continuous filaments or tow with a fiber cutting assembly such as manufactured by the Lummus Company and described in U.S. Pat. No. 3,485,120 to Keith and U.S. Pat. No. 3,831,481 to Van Doorn et al, herein incorporated by reference. Such a cutting assembly has a cutter reel with a plurality of radially spaced apart, outwardly facing cutting blades and a presser roll mounted adjacent to the cutter reel and having a peripheral surface positioned at a predetermined distance from the outwardly facing edges of the cutting blades to define a cutting gap.

Typically, setting the gap of such a cutting assembly has been done using a rubber block squeezed between the cutting blades and presser roll, and visually determining how deep the blades are cutting and whether the depth thereof indicates a proper gap setting. As is readily apparent, this approach is largely dependent upon the skill of the operator, and is subject to error due to the rubber compressibility and crack propagation in the rubber block, and to blade sharpness.

The present invention eliminates much of this inaccuracy and human error by utilizing a gauge and electrical sensing device to automatically indicate with a signal when the proper gap setting has been achieved by sensing contact of the gauge with the presser roll.

Electrical sensing devices have been employed in a variety of cutting devices. Exemplary devices are disclosed in U.S. Pat. No. 3,903,609 to Brown, U.S. Pat. No. 4,355,554 to Gregory, III, and U.S. Pat. No. 4,519,142 to Parker. These devices, however, have not utilized the sensing device acting cooperatively with a fiber cutting assembly of the type having a cutter reel and a presser roll mounted adjacent to the cuttier reel.

SUMMARY OF THE INVENTION

When cutting continuous filaments or tow into cut staple fibers of spinable lengths, it is critical that the cutting performance of the cutting blades is exact and consistent in that the lengths must be cut accurately and repetitively on a large scale. To this end, it is important that the gap between the blades of the cutter reel and the presser roll of the cutting assembly be precisely maintained and easy to control. In accordance with the present invention, an apparatus and method for accurately setting the cutting gap of a fiber cutting assembly is provided.

Specifically, the apparatus and method of the present invention utilizes a gauge member at one of the cutting blade positions and extending radially outwards beyond the radial distance of the blades and corresponding to the desired gap setting, and means for electrically sensing contact of the gauge with the presser roll. The gap is accurately set by first positioning a gauge member at one of the cutting blade positions. The cutter reel is rotated to bring the gauge member towards the presser roll, and the latter is adjusted relative to the cutter reel so as to contact the gauge member with the presser roll. This contact is sensed electrically and an indication is given that the gap has been accurately set.

BRIEF DESCRIPTION OF THE DRAWINGS

FIG. 1 is a perspective view of the fiber cutting assembly comprising a cutter reel and a presser roll and the apparatus of the present invention.

FIG. 2 is a sectional view taken along line 2—2 of FIG. 1 and showing in detail the gauge member at one of the cutting blade positions.

FIG. 3 is an enlarged perspective view of a gauge member mounted in a cutting blade post.

DETAILED DESCRIPTION OF THE INVENTION

The present invention now will be described more fully hereinafter with reference to the accompanying drawings, in which a preferred embodiment of the invention is shown. This invention can, however, be embodied in many different forms and should not be construed as limited to the embodiment set forth herein; rather, applicants provide this embodiment so that this disclosure will be thorough and complete, and will fully convey the scope of the invention to those skilled in the art.

FIG. 1 discloses the basic fiber cutting assembly, generally indicated by the reference numeral 10, employed in the embodiment of the present invention. The basic fiber cutting assembly 10 comprises a cutter reel 11 and a presser roll 12. The cutter reel 11 is adapted to be mounted on a shaft 13 which is supported by a cutter frame and interconnected to a motor or the like (not shown) so that the entire reel rotates in direction A. The cutter reel carries a plurality of razor-sharp radially spaced apart, outwardly facing, cutting blades 15 wherein the spacing between blades is substantially equal to the fiber length desired. The presser roll 12 is mounted on a shaft 16 interconnected to a pivotable support arm 17 which can pivotably adjust the presser roll 12 so as to have a peripheral surface of the roll positioned a predetermined position from the outwardly facing cutting blades 15. When the presser roll 12 is engaged during cutting, the blades 15 are cutting at the points where the blades are in alignment with the axis of the presser roll 12 and the blades are at the point closest to the presser roll 11. It is the gap G at this point of alignment which is accurately set.

In operation, the reel 11 is rotated to cause continuous strands of fiber or tow to become wrapped around the periphery of the reel 11 over the cutting blades 15 so that the presser roll engages the outer surface of the wrapped strands at the points where the blades 15 are in alignment with the axis of the presser roll 12. This forces the inner surface of the fiber into cutting contact with the blades 15 as the cutter reel 11 rotates thereby cutting the fiber filaments into short lengths. It is the accurate setting of the gap between the blades 15 of the cutter reel 11 and presser roll 12 at the points of alignment that the present invention is directed.

The gap G is accurately set and optimized utilizing an apparatus comprising a gauge member 20 which replaces one of the cutting blades 15 and means for electrically sensing contact of the gauge member 20 with the presser roll 12. The means for electrically sensing is typically a conductive band 30. The gauge member 20 extends radially outwards beyond the radial distance of the blades 15 and this distance corresponds to the desired gap setting G less the thin width of the conductive band 30. Referring to FIG. 3, the gauge member 20 is metallic and comprises a dowel-shaped piece and a blade portion 21 to which the dowel-shaped piece is attached. The gauge member is mounted in a cutting blade housing or post 22 by positioning the blade portion 21 of the gauge member in a longitudinal slot 23, the width of which is substantially the same as the width of the blade portion 21. The gauge member also includes hooks 25 for facilitating securing the gauge member to the cutting blade post 22 by utilizing elastic means 26 such as a rubber band wrapped around the post 22 and connected to the hooks 25 as shown in FIG. 2. The hooks 25 also provide a convenient electrical connection point.

With respect to electrical connections, conducting wire 27 is connected between the gauge member 20, a power source 31 and an electrical indicator 33. The connection between the gauge member 20 and the power source 31 is usually made utilizing an electrical connector 32 such as the alligator clip illustrated in FIG. 2, which is attached to the hooks 25 of the gauge member 20. As shown in FIG. 1, the power source 31 is typically a low voltage battery 31 and the indicator 33 is usually an incandescent lamp 33a. The incandescent lamp, however, may be replaced by any other suitable electrically activated signal or indicator such as an audible buzzer or bell. Conducting wire 28 also connects the power source and electrical indicator 33 to the conductive band 30 for sensing contact of the gauge member 20 to the pressure roll 12.

When the gauge member 20 makes contact with the conductive band 30 at the presser roll 12, the circuit is completed causing the electrical indicator 33 to be activated. It is recognized that the components of the electrical circuit may be placed at different positions within the circuit, and that the conductive wires 27, 28 may be connected to the gauge member 20 and the conductive band 30, respectively, in any desired manner.

In operation, the cutting gap setting of the fiber cutting assembly is checked and set at regular intervals such as once a week. The optimization and accurate setting of the gap is performed by stopping the cutter reel 11 and removing any residual fiber or tow. A gauge member is positioned in place of one of the cutting blades 15. The cutter reel 11 is rotated in direction A, to bring the gauge member 20 toward the presser roll 12. The presser roll 12 is pivotably adjusted relative to the cutter reel 11 so as to contact the gauge member 20. This contact is sensed by the conductive band 30 located around the presser roll 12, the electrical circuit is closed on contact and the indicator 33 signals that the desired gap has been accurately set. The presser roll 12 is then secured in place to maintain the gap setting and the gauge member 20 is removed and replaced by a regular cutting blade 15 for continued cutting.

The foregoing embodiment is to be considered illustrative rather than restrictive of the invention, and those modifications which come within the meaning and range of equivalents of the claims are to be included therein.

What is claimed is:

1. An apparatus for accurately setting the cutting gap of a fiber cutting assembly of the type having a cutter reel with a plurality of radially spaced apart, outwardly facing cutter blades and a presser roll mounted adjacent to the cutter reel and having a peripheral surface positioned at a predetermined distance from the outwardly facing edges of the cutter blades to define said cutting gap, said apparatus comprising:
   (a) a gauge member at one of the cutting blade positions and extending radially outward beyond the radial distance of the blades and corresponding to the desired cutting gap setting and
   (b) means interconnecting the gauge member and the presser roll for electrically sensing contact of the gauge member with the presser roll.

2. An apparatus according to claim 1 wherein the means for electrically sensing contact of the gauge member with the presser roll comprises a conductive band positioned around the presser roll, an electrical indicator, power means for energizing the electrical indicator and an electrical circuit connecting the gauge member, the conductive band, the electrical indicator and the power means so that the electrical indicator is energized when the gauge member contacts the conductive band.

3. An apparatus according to claim 2 wherein the electrical indicator is an incandescent lamp and the power source is a low voltage battery.

4. An apparatus according to claim 1 wherein the gauge member is metallic and comprises a dowel-shaped portion and a blade portion to which the dowel-shaped portion is attached.

5. An apparatus according to claim 4 wherein the gauge member includes a pair of hooks for securing the gauge member at one of the cutting blade positions and to provide an electrical connection point.

6. A method for accurately setting the cutting gap of a fiber cutting assembly of the type having a rotatable cutter reel with a plurality of radially spaced apart, cutting blades and a presser roll mounted adjacent to the cutter reel and having a peripheral surface positioned at a predetermined distance from the edges of the cutting blades to define the cutting gap, said method comprising:
   (a) positioning a gauge member at one of the cutting blade positions, a gauge member which extends radially beyond the radial distance of the cutting blades and a predetermined distance corresponding to the desired cutting gap;
   (b) rotating the cutter reel to bring the gauge member towards the presser roll;
   (c) adjusting the position of the presser roll relative to the cutter reel so as to contact the gauge member with the presser roll; and
   (d) sensing electrically the contact of the gauge member and the presser roll so as to indicate when the gap has been acccurately set.

7. A method according to claim 6 wherein the step of sensing electrically the contact of the gauge member and the presser roll includes contacting the gauge member to a conductive band positioned around the presser roll, thereby closing an electrical circuit and energizing an electrical indicator which signals that the gap has been accurately set.

* * * * *